R. L. FRINK.
METHOD OF AND MEANS FOR MANUFACTURE OF WINDOW GLASS.
APPLICATION FILED SEPT. 25, 1907.
941,512.
Patented Nov. 30, 1909.
2 SHEETS—SHEET 1.
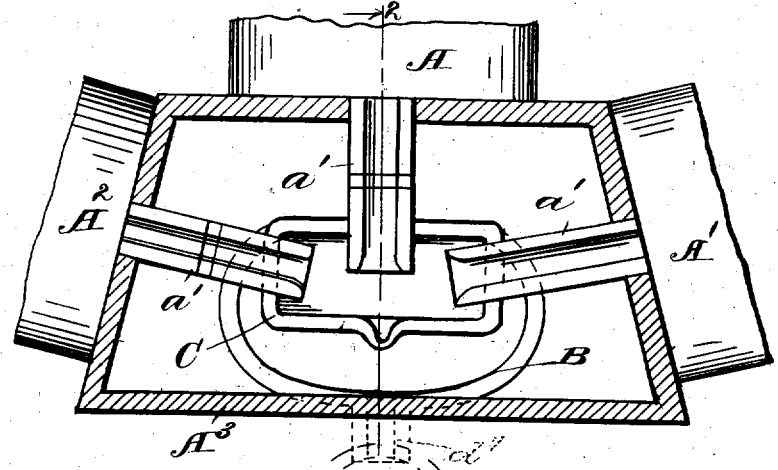
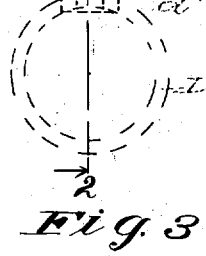
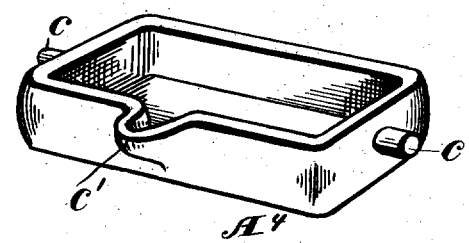
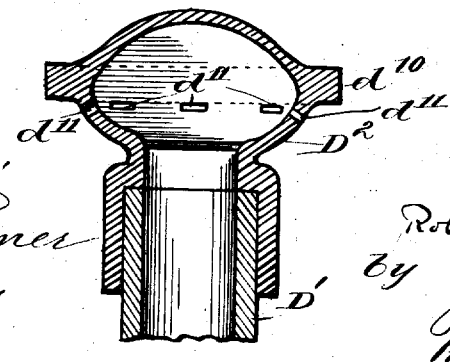
Witnesses:
J. C. Turner
Jno. F. Oberlin
Inventor:
Robert L. Frink,
by J. B. Fay
his attorney

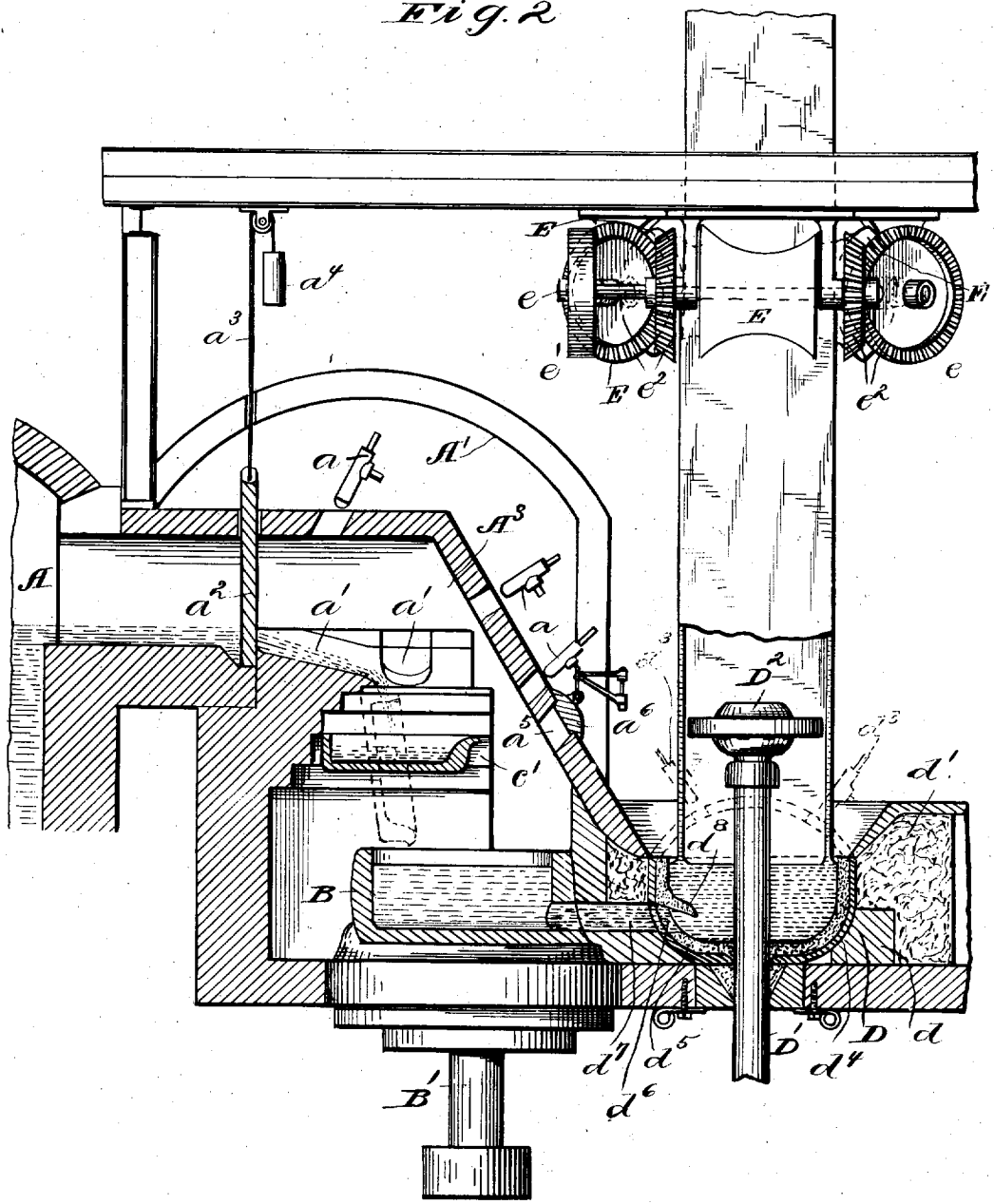

UNITED STATES PATENT OFFICE.

ROBERT L. FRINK, OF CLEVELAND, OHIO.

METHOD OF AND MEANS FOR MANUFACTURE OF WINDOW-GLASS.

941,512.  Specification of Letters Patent.  Patented Nov. 30, 1909.

Application filed September 25, 1907. Serial No. 394,459.

*To all whom it may concern:*

Be it known that I, ROBERT L. FRINK, a citizen of the United States, resident of Cleveland, county of Cuyahoga, and State of Ohio, have invented a new and useful Improvement in Methods of and Means for the Manufacture of Window-Glass, of which the following is a specification, the principle of the invention being herein explained and the best mode in which I have contemplated applying that principle, so as to distinguish it from other inventions.

This invenion relates to the manufacture of glass, particularly to the manufacture of colored or cathedral glass such as is used in windows, or the like; as will be obvious, however, the process and apparatus hereinafter described are susceptible of much more general use in the art named than that just stated.

Heretofore in the manufacture of colored glass it has been a very difficult matter to obtain definite color effect, or, in other words, a uniform mixture of the coloring substances or pigments throughout the mass of glass. The result has been not merely an unsatisfactory product in the particular noted, but also, due to the different co-efficients of expansion of the several ingredients thus improperly mingled, great difficulty has been experienced in producing a finished article of which the surface shall be smooth and polished. Moreover, especially in the manufacture of window or sheet glass from such material, the danger of accidental and even spontaneous rupture due to the inherent strain thus incurred is a source of constant trouble. These difficulties are in great measure due to the fact that the glass is of a viscous nature and is only miscible at a high temperature, as also to the fact that radiation takes place at an enormous rapidity at the temperature required to render the metals properly miscible. Consequently, when the glass, as in the prevailing process, is ladled from the tanks where it has been melted to the vessel wherein it is worked, the surfaces exposed to the air immediately become chilled and a skin or film of non-miscible metal is produced, as a result of which cords tend to form in case the glass is subsequently drawn, and in any event tension and compression strains occur in the completed article that tend to rupture the same even where the glass is molded or otherwise worked. In view of the foregoing considerations such manufacture of variegated or colored glass has been a case of hit and miss both as to the production of the proper coloring effect and as to the avoidance of internal strains and stresses that render the product worthless.

The object of the present process, and apparatus for carrying on the same, is to avoid the several difficulties in the production of the glass just named, whereby colored or cathedral glass of a known and definite composition, and possessed of all the desirable qualities, so far as handling is concerned, that ordinary or clear window glass possesses, may be produced.

To the accomplishment of this and related ends said invention then consists of the steps and the means for carrying out the same, hereinafter fully described and specifically set forth in the claims.

The annexed drawings and the following description set forth in detail certain means embodying the invention and one specific mode for carrying out the same, such means and disclosed mode, however, constituting but one of the various ways in which the principle of the invention may be used.

In said annexed drawings:—Figure 1 represents in plan view and in more or less diagrammatic form, a plant for the manufacture of colored or cathedral glass in accordance with my improved process or method; Fig. 2 is a central section through one of the furnaces of such plant together with the parts appurtenant thereto; Fig. 3 is a perspective view of a measuring vessel forming a feature of such plant; and Fig. 4 is a section of an improved form of drawing head utilized in connection with the foregoing apparatus in the drawing of glass cylinders.

Having reference then to the drawings just described, A shows in section, Fig. 2, a tank furnace of the usual type, the crown or cap of a second similar furnace A′ appearing in end view. In these furnaces are melted the necessary materials for the making of glass. Two or more, in the case in hand three A A′ A², such furnaces are desirably located with their operative ends contiguous one to the other and to a central point where is located a mixing vessel B. Mixing vessel B is preferably supported upon a lift B', hydraulic or otherwise, so that it may be lowered through the floor of chamber $A^3$ when desired. Access to the interior of the chamber $A^3$ and to the vessel B, for purposes of observation, or the like, is provided for by an opening $a^5$ that is normally closed by means of a swinging door $a^6$, Fig. 2. Such contiguously located furnace ends, together with mixing vessel B, are all desirably inclosed within a common chamber $A^3$ auxiliary to the respective furnaces, in other words, opening freely into the upper portions of their interiors and thus maintained at substantially the temperature of such furnaces. To avoid the slight cooling effect that might be due to radiation, burners $a$ are desirably provided in conjunction with such chamber as shown. Such operative ends of the respective furnaces are provided with suitable means for discharging glass consisting of spill-ways $a'$ each controlled by means of a gate or valve $a^2$ that is preferably hung from a cable $a^3$ to which is attached a counterweight $a^4$. Any suitable means for raising and lowering said gate may be utilized. In connection with such spill-ways $a'$ there is provided an oscillatory graduate C or measuring vessel composed of clay and oscillatory in suitable bearings in which it is supported by lugs $c$ extending oppositely from its side walls and forming trunnions as it were. Such measuring vessel is adapted in its normal positions to receive metal from the respective furnaces through the corresponding spill-ways, and mixing vessel B is so located with reference thereto as to be adapted to receive its contents when it is oscillated or tilted upwardly. To facilitate the discharge of such contents vessel C is furthermore provided with a lip or spout $c'$ as shown. Located without the chamber $A^3$ is a working vessel D that has unobstructed connection with such mixing vessel. Such working vessel in the case at hand consists of a drawing pot to the details of the structure of which more particular attention will be called later. Such working vessel is suitably supported in walls $d$ that laterally inclose the same and rise some distance thereabove. Such walls are furthermore hollow so as to permit of the introduction of an effective heat-insulating material $d'$ such as asbestos so as to substantially entirely surround such vessel. It is from this working vessel D that the glass is designed to be removed for operative purposes, whether in the ordinary operation of blowing or molding, or as, in the case illustrated, to be drawn in the form of cylinders as in the manufacture of window glass. The apparatus illustrated, as stated, relates to the drawing of cylinders in the latter connection, and is in its general features the same as that described and claimed in my recently issued patent No. 846,102, March 5, 1907. The drawing pot, however, in the case of the method and construction in hand, is designed on a substantially different principle. In the description of the drawing pot in the patent just named, it has been considered desirable to surround the pot by some heating medium, or to apply heating means, as gas burners, externally thereto. Not only, in fact, has such artificial control of the temperature of the metal in the pot been deemed quite essential by many, but similar regulation of the temperature of the cylinder from the point where it rises from the surface of the metal to the point of set has been attempted by various forms of water cooled chilling rings and the like. As a result of numerous experiments I am convinced that such attempted regulation may well be dispensed with in both instances, since in practice the harmful effects accruing therefrom far outweigh any alleged theoretical advantages. I accordingly prefer to employ a drawing-pot mounted, as above described, in a heat-insulating bed, thus preventing quite completely for all practical purposes the uncertain action of radiation and convection which constitute the two chief elements in the dissipation of heat. The only element thus left, with which to deal, is conduction. By virtue of the construction adopted, loss of heat by this mode of dissipation is so minimized that once the pot has been raised to the proper temperature, it is so maintained by the continuous supply of fresh metal from the mixing vessel as such metal is withdrawn from the pot. The effects of conduction, furthermore, I would control by a suitable construction of the heat-insulating bed, particularly of that portion of the latter which rises above the level of the metal in the pot, so as to render such effects symmetrical with respect to the axis of the cylinder being drawn. Such control it is quite possible to secure, since the essential element to be sought therein is a proper proportioning of the distances between the object sought to be affected and the temperature which such object would otherwise have. Where, as contemplated in the construction of pot or drawing vessel illustrated, means presently to be described are provided for diffusing generally throughout the metal in the pot the fresh admixture, the disposition of the inclosing walls wherein such pot is supported will be geometrically symmetrical as well as functionally so. It is conceivable, however, that where diverse temperature conditions did exist in different parts of the bath of metal from which the cylinder is being drawn, if such conditions were continuing and so could be plotted as it were, a suitable deviation from a geometrical symmetry in the construction of the surrounding walls would result in accomplishing the desired result, that of producing an equable cooling effect upon the metal, having regard to the location of the cylinder being drawn.

Before starting to operate the plant it is of course desirable to initially raise the temperature of the pot to the point previously referred to as obtaining under normal operative conditions; this may be readily done by providing, as shown in dotted outline in Fig. 2, a hood or cover $d^2$, through apertures in which a gaseous heating blast may be introduced from burners $d^3$. This cover and such external heating means have both to be removed, aside from any considerations above discussed, in order to permit the insertion of the drawing head, presently to be described, and the subsequent introduction into the pot of the bait and the carrying on of the drawing operation.

In addition to the more or less basic change in the design of the drawing pot just considered, other changes of a minor and accessory character have also been introduced. Thus I construct such pot, with an exterior metal jacket $d^4$, within which is provided a lining $d^5$, of clay or other suitable refractory material with which alone the molten glass comes into contact. Both jacket $d^4$ and such lining $d^5$ are formed on one side with an opening $d^6$ that registers with the conduit or opening $d^7$ extending from the mixing chamber B. Such clay lining $d^5$ furthermore carries a projection $d^8$, lying directly over the opening $d^7$ in question, the purpose of which is to deflect downwardly the more heated metal as it flows into the drawing-pot from the mixing vessel and thus prevent the same from rising directly to the surface. This fresh metal is thus caused to diffuse generally throughout the mixture in such pot and the temperature of the upper stratum from which the drawing takes place is left undisturbed. The shell or metal jacket $d^4$ is desirably provided with means, not shown, for attaching thereto suitable hoisting means for removing or placing the pot in position as the case may be. Centrally arising through said drawing pot and extending some distance thereabove is a hollow column D′ surmounted by a head $D^2$ around which the hollow glass article is drawn, said head being of a size to substantially close the hollow article and serving as a means to regulate the pressure between this and the bath of metal in the pot, all as is more fully set forth in said Patent No. 846,102. The hollow glass article, or cylinder in the case in hand, is drawn of indefinite length by means permitting of the progressive changing of the point of application of the drawing strain thereto. Such means as shown are a modification of those described in my patent above referred to, in that instead of two oppositely disposed gripping rolls having peripheral surfaces of spring character, I employ three such rolls E disposed in triangular relation to each other. These rolls are carried, by suitable shafts $e$ and are adapted all to be driven positively and in unison from a single driving pulley $e'$ by means of gear wheels $e^2$ connected as indicated in Fig. 2. The construction of the drawing head $D^2$, is also modified, in that, instead of making the same of metal and so necessitating the employment of cooling means in connection therewith, as described before, I now construct such head of clay or other refractory material and furthermore form the same with but a single peripheral flange $d^{10}$ instead of two, the air escaping into the cylinder from the column as before through suitable openings $d^{11}$ provided intermediate of said flange and the level of the metal bath in the pot.

Having thus described, in what is thought sufficient detail, the structural features characterizing my improved apparatus, I shall now briefly describe the operation of the same and so the general method exemplified in such operation. In such operation then, assuming that it is desired to make colored or cathedral glass, measured quantities of the several ingredient metals are successively withdrawn from the respective tank furnaces A and transferred to the mixing vessels B by means of the oscillatory measuring vessel $A^4$ until a sufficient quantity of metal has been accumulated in vessel B to cause the level thereof in the freely connected working vessel D to rise to the proper height to permit the drawing operation to begin. Upon commencement of such drawing operation as fast as the metal is withdrawn from the drawing pot additional measured quantities of the several ingredient metals are added from time to time to the mixing vessel B so as to maintain the level of the metal at substantially the same height. Such successive charges of the different ingredient metals being deposited at the further end of the mixing vessel it will be obvious that by reason of their flow therethrough and into the drawing pot they will become intermixed and distributed in a peculiar manner and quite automatically. Should any assistance in so mixing the mass in vessel B be required, opening $a^5$ affords a convenient means of access to the pot. Through the same opening additional ingredients in the way of pigments or the like may also be introduced.

In the drawing pot the temperature of the mass, even if a trifle lower than that in the mixing vessel, is, what is much more important, uniform. Cords and blowouts in the cylinder being drawn are thus obviated, incidents that are practically unavoidable where extraneous, artificial, means, whose effects are of necessity localized, are employed either to raise or lower the temperature of the material being worked.

While the good results that I achieve by the several improvements in process and apparatus hereinbefore described are particularly noticeable in the manufacture of colored or cathedral glass in all its various forms, there is no intention to limit such process and apparatus to this peculiar field. It is also to be understood that I do not confine the application of the above described process to drawing glass alone, inasmuch as in place of a working vessel of the character described adapted for use with drawing mechanism any suitable vessel may be connected to receive the metal from the mixing vessel and the metal then withdrawn from such working vessel either for use in a molding machine or any of the other various ways in which glass may be worked, whether by hand or by machine.

Other modes of applying the principle of my invention may be employed instead of the one explained, change being made as regards the process herein disclosed, provided the steps or means stated by any one of the following claims or the equivalent of such steps or means be employed.

I therefore particularly point out and distinctly claim as my invention:—

1. The method of manufacturing colored, or cathedral, glass, which consists in separately maintaining in molten state bodies of the several ingredient metals, and then mingling such metals apart from the working vessel.

2. The method of manufacturing colored, or cathedral, glass, which consists in separately maintaining in molten state bodies of the several ingredient metals, mingling such metals apart from the working vessel, and then conducting such metals in a combined stream to such working vessels.

3. The method of manufacturing colored, or cathedral, glass, which consists in separately maintaining in molten state bodies of the several ingredient metals, withdrawing measured quantities of the metals from such bodies and mingling the same apart from the working vessel, and then conducting such metals in a combined stream to such working vessel.

4. The method of manufacturing colored, or cathedral, glass, which consists in intermittently pouring measured quantities of the several ingredient metals into a mixing vessel apart from the working vessel.

5. The method of manufacturing colored, or cathedral, glass, which consists in intermittently pouring measured quantities of the several ingredient metals into a mixing vessel apart from the working vessel, and then conducting such metals in a combined stream from such mixing to such working vessel.

6. The method of manufacturing colored, or cathedral, glass, which consists in intermittently pouring measured quantities of the several ingredient metals into a mixing vessel apart from the working vessel, conducting such metals in a combined stream from such mixing to such working vessel, and continuously drawing the same from such working vessel.

7. The method of manufacturing colored, or cathedral, glass, which consists in maintaining bodies of the several ingredient metals in a molten state in separate melting furnaces, and then mingling such metals at a temperature substantially the same as that of said furnaces.

8. The method of manufacturing colored, or cathedral, glass, which consists in maintaining bodies of the several ingredient metals in a molten state in separate melting furnaces, mingling such metals apart from the working vessel and at a temperature substantially the same as that of said furnaces, and then conducting such metals in a combined stream to such working vessels.

9. The method of manufacturing colored, or cathedral, glass, which consists in maintaining bodies of the several ingredient metals in a molten state in separate melting furnaces, withdrawing measured quantities of the metals from such bodies and mingling the same apart from the working vessel and at a temperature substantially the same as that of said furnaces and then conducting such metals in a combined stream to such working vessel.

10. The method of manufacturing colored, or cathedral, glass, which consists in intermittently pouring measured quantities of the several ingredient metals into a mixing vessel apart from the working vessel and under a temperature substantially the same as that in the melting furnace, and then conducting such metals in a combined stream from such mixing to such working vessel.

11. The method of manufacturing colored, or cathedral, glass, which consists in intermittently pouring measured quantities of the several ingredient metals into a mixing vessel apart from the working vessel and under a temperature substantially the same as that in the melting furnace, conducting such metals in a combined stream from such mixing to such working vessel, and continuously drawing the same from such working vessel.

12. In apparatus of the class described, the combination of a plurality of tank furnaces, a mixing vessel, a working vessel having connection with said mixing vessel, and means for transferring measured quantities of metal to said mixing vessel from either of said furnaces as desired.

13. In apparatus of the class described, the combination of a plurality of tank furnaces, a mixing vessel, a working vessel having uninterrupted connection with said mixing vessel, and means for transferring to said mixing vessel measured quantities of metal from either of said furnaces as desired.

14. In apparatus of the class described, the combination of a plurality of tank furnaces, a chamber having free communication with the upper portion of said furnaces, a mixing vessel in said chamber, means, also within said chamber, for intermittently transferring metal to said vessel from either of said furnaces as desired, and a working vessel located without said chamber but connected with said mixing vessel.

15. In apparatus of the class described, the combination of a tank furnace, a chamber having free communication with the upper portion of said furnace, a mixing vessel in said chamber, means, also within said chamber, for transferring measured quantities of metal from said furnace to said vessel, and a working vessel located without said chamber but having unobstructed connection with said mixing vessel.

16. In apparatus of the class described, the combination of a tank furnace, a chamber having free communication with the upper portion of said furnace, a mixing vessel located in said chamber, an oscillatory measuring vessel for transferring metal from said furnace to said mixing vessel, a working vessel located without said chamber, and a conduit affording unobstructed communication between said working and mixing vessels.

17. In apparatus of the class described, the combination of a tank furnace, a chamber having free communication with the upper portion of said furnace, said furnace being provided with a spill-way extending into said chamber, a gate controlling such spill-way, a mixing vessel located in said chamber, an oscillatory measuring vessel adapted in one position to receive metal through such spill-way from said furnace and in another position to pour such metal into said mixing chamber, a working vessel located without said chamber, and a conduit affording unobstructed communication between said working and mixing vessels.

18. In apparatus of the class described, the combination of a plurality of tank furnaces, a mixing vessel located contiguously thereto, a working vessel having connection with said mixing vessel, and means for intermittently transferring metal from the respective furnaces to said mixing vessel.

19. In apparatus of the class described, the combination of a plurality of tank furnaces, a mixing vessel located contiguously thereto, a working vessel having uninterrupted connection with said mixing vessel, and means for transferring measured quantities of metal from the respective furnaces to said mixing vessel.

20. In apparatus for manufacturing colored, or cathedral, glass, the combination of a plurality of tank furnaces having contiguously located ends, a chamber connecting such ends and having free communication with the interior of the respective furnaces, a mixing vessel located within said chamber, means, also within said chamber, for intermittently transferring metal from said furnaces, respectively, to said mixing vessel, and a working vessel located without said chamber but connected with said mixing vessel.

21. In apparatus for manufacturing colored, or cathedral, glass, the combination of a plurality of tank furnaces having contiguously located ends, a chamber connecting such ends and having free communication with the interior of the respective furnaces, a mixing vessel located within said chamber, means, also within said chamber, for transferring measured quantities of metal from said furnaces, respectively, to said mixing vessel, and a working vessel located without said chamber but having unobstructed connection with said mixing vessel.

22. In apparatus for manufacturing colored, or cathedral, glass, the combination of a plurality of tank furnaces having contiguously located ends, a chamber connecting such ends and having free communication with the interior of the respective furnaces, a mixing vessel located within said chamber, oscillatory measuring vessels, one for each furnace, for transferring metal from such furnace to said mixing vessel, a working vessel located without said chamber, and a conduit affording unobstructed communication between said working and mixing vessels.

23. In apparatus for manufacturing colored, or cathedral, glass, the combination of a plurality of tank furnaces having contiguously located ends, a chamber connecting such ends and having free communication with the interiors of the respective furnaces, each of said furnaces being provided with a spill-way extending into said chamber, gates controlling said spill-ways, respectively, a mixing vessel located in said chamber, oscillatory measuring vessels, one for each furnace, adapted in one position to receive metal through the corresponding spillway and in another position to pour such metal into said mixing chamber, a working vessel located without said chamber, and a conduit affording unobstructed communication beween said working and mixing vessels.

24. In apparatus of the class described, the combination of a plurality of tank furnaces, a mixing vessel located contiguously thereto, means for transferring measured quantities of metal from the respective furnaces to said mixing vessel, a working vessel having connection with said mixing vessel, and means for drawing glass from said working vessel.

25. In apparatus of the class described, the combination of a plurality of tank furnaces having contiguously located ends, a chamber connecting such ends and having free communication with the interior of the respective furnaces, a mixing vessel located within said chamber, means for transferring measured quantities of metal from the respective furnaces to said mixing vessel, a working vessel located without said chamber having uninterrupted connection with said mixing vessel; and means for continuously drawing glass from said working vessel.

26. In apparatus of the class described, the combination with a working vessel, of a bed supporting and laterally inclosing the same, said bed comprising heat-insulating material, whereby the heat-dissipating effects of radiation and convection upon the metal in said vessel are substantially eliminated, said bed being furthermore so constructed as to render the effects of conduction upon such metal symmetrical with respect to the article being drawn.

27. In apparatus of the class described, the combination with a working vessel, of a bed supporting and laterally inclosing the same, said bed comprising heat-insulating material, whereby the heat-dissipating effects of radiation and convection upon the metal in said vessel are substantially eliminated, said bed furthermore rising above the level of such metal and being so constructed as to render the effects of conduction upon such metal symmetrical with respect to the article being drawn.

28. The method of producing glass articles, which consists in drawing the same from a bath of molten glass, substantially eliminating the effects of radiation and convection upon such bath, and controlling conduction therefrom so as to render the effects of the latter symmetrical with respect to the spect to the article being drawn.

29. The method of producing hollow glass articles, which consists in drawing a cylinder from a bath of molten glass, substantially eliminating the effects of radiation and convection upon such bath, and controlling conduction therefrom so as to render the effects of the latter symmetrical with respect to the article being drawn.

Signed by me this 28th day of August, 1907.

ROBERT L. FRINK.

Attested by—
MARY ISRAEL,
JNO. F. OBERLIN.

---

It is hereby certified that in Letters Patent No. 941,512, granted November 30, 1909, upon the application of Robert L. Frink, of Cleveland, Ohio, for an improvement in "Methods of and Means for Manufacture of Window-Glass," an error appears in the printed specification requiring correction as follows: Page 6, line 50, the syllable and words "spect to the" should be stricken out; and that the said Letters Patent should be read with this correction therein that the same may conform to the record of the case in the Patent Office.

Signed and sealed this 21st day of December, A. D., 1909.

[SEAL.]

C. C. BILLINGS,

*Acting Commissioner of Patents.* thereto, means for transferring measured quantities of metal from the respective furnaces to said mixing vessel, a working vessel having connection with said mixing vessel, and means for drawing glass from said working vessel.

25. In apparatus of the class described, the combination of a plurality of tank furnaces having contiguously located ends, a chamber connecting such ends and having free communication with the interior of the respective furnaces, a mixing vessel located within said chamber, means for transferring measured quantities of metal from the respective furnaces to said mixing vessel, a working vessel located without said chamber having uninterrupted connection with said mixing vessel; and means for continuously drawing glass from said working vessel.

26. In apparatus of the class described, the combination with a working vessel, of a bed supporting and laterally inclosing the same, said bed comprising heat-insulating material, whereby the heat-dissipating effects of radiation and convection upon the metal in said vessel are substantially eliminated, said bed being furthermore so constructed as to render the effects of conduction upon such metal symmetrical with respect to the article being drawn.

27. In apparatus of the class described, the combination with a working vessel, of a bed supporting and laterally inclosing the same, said bed comprising heat-insulating material, whereby the heat-dissipating effects of radiation and convection upon the metal in said vessel are substantially eliminated, said bed furthermore rising above the level of such metal and being so constructed as to render the effects of conduction upon such metal symmetrical with respect to the article being drawn.

28. The method of producing glass articles, which consists in drawing the same from a bath of molten glass, substantially eliminating the effects of radiation and convection upon such bath, and controlling conduction therefrom so as to render the effects of the latter symmetrical with respect to the article being drawn.

29. The method of producing hollow glass articles, which consists in drawing a cylinder from a bath of molten glass, substantially eliminating the effects of radiation and convection upon such bath, and controlling conduction therefrom so as to render the effects of the latter symmetrical with respect to the article being drawn.

Signed by me this 28th day of August, 1907.

ROBERT L. FRINK.

Attested by—
MARY ISRAEL,
JNO. F. OBERLIN.

---

Correction in Letters Patent No. 941,512.

It is hereby certified that in Letters Patent No. 941,512, granted November 30, 1909, upon the application of Robert L. Frink, of Cleveland, Ohio, for an improvement in "Methods of and Means for Manufacture of Window-Glass," an error appears in the printed specification requiring correction as follows: Page 6, line 50, the syllable and words "spect to the" should be stricken out; and that the said Letters Patent should be read with this correction therein that the same may conform to the record of the case in the Patent Office.

Signed and sealed this 21st day of December, A. D., 1909.

[SEAL.]

C. C. BILLINGS,

*Acting Commissioner of Patents.*

Correction in Letters Patent No. 941,512.

It is hereby certified that in Letters Patent No. 941,512, granted November 30, 1909, upon the application of Robert L. Frink, of Cleveland, Ohio, for an improvement in "Methods of and Means for Manufacture of Window-Glass," an error appears in the printed specification requiring correction as follows: Page 6, line 50, the syllable and words "spect to the" should be stricken out; and that the said Letters Patent should be read with this correction therein that the same may conform to the record of the case in the Patent Office.

Signed and sealed this 21st day of December, A. D., 1909.

[SEAL.]

C. C. BILLINGS,
*Acting Commissioner of Patents.*